(12) United States Patent
Mihály et al.

(10) Patent No.: US 10,616,185 B2
(45) Date of Patent: Apr. 7, 2020

(54) METHODS AND FIRST, SECOND AND NETWORK NODES FOR MANAGING TRAFFIC CHARACTERISTICS

(71) Applicant: Telefonaktiebolaget LM Ericsson (publ), Stockholm (SE)

(72) Inventors: Attila Mihály, Dunakeszi (HU); Szilveszter Nádas, Budapest (HU); Lars Westberg, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 260 days.

(21) Appl. No.: 15/323,019

(22) PCT Filed: Mar. 11, 2015

(86) PCT No.: PCT/SE2015/050269
§ 371 (c)(1),
(2) Date: Dec. 29, 2016

(87) PCT Pub. No.: WO2016/003348
PCT Pub. Date: Jan. 7, 2016

(65) Prior Publication Data
US 2017/0142074 A1 May 18, 2017

Related U.S. Application Data

(60) Provisional application No. 62/021,024, filed on Jul. 4, 2014.

(51) Int. Cl.
*H04L 29/06* (2006.01)
*H04L 12/851* (2013.01)
(Continued)

(52) U.S. Cl.
CPC ........... *H04L 63/0428* (2013.01); *G09C 1/00* (2013.01); *H04L 12/6418* (2013.01);
(Continued)

(58) Field of Classification Search
CPC . H04L 47/2441; H04L 47/2483; H04L 69/22; H04L 9/0244; H04L 63/166; H04L 47/00; H04L 47/24–2491
See application file for complete search history.

(56) References Cited

U.S. PATENT DOCUMENTS 8,228,861 B1 * 7/2012 Nix ...................... H04W 36/00
370/329
8,745,185 B1 * 6/2014 Salo .................... H04L 63/0428
709/223

(Continued)

OTHER PUBLICATIONS

Babiarz, J. et al., "Configuration Guidelines for DiffServ Service Classes", IETF Network Working Group, RFC 4594, Aug. 2006, 1-58.

(Continued)

*Primary Examiner* — Daniel B Potratz
*Assistant Examiner* — D'Arcy Winston Straub
(74) *Attorney, Agent, or Firm* — Murphy, Bilak & Homiller, PLLC

(57) ABSTRACT

Methods and a first node, a second node and a network node for managing traffic characteristics of one or more packets on a connection are disclosed. The first node exchanges, with the network node, traffic characteristic semantics and a common key for encryption of a traffic characteristic value to be applied for the one or more packets on the connection, wherein the traffic characteristic semantics include the traffic characteristic value and an associated characteristic for the one or more packets. Moreover, the first node sends the traffic characteristic value and the common key to the second node. The network node checks and applies the traffic characteristics value according to service policies of the network node. Next, the first node exchanges, with the second node, payload which includes one or more packets over the connection. Information about the traffic character- (Continued)

istic value is included in a transport header of each packet carrying the payload.

14 Claims, 10 Drawing Sheets

(51) Int. Cl.
    *H04L 12/64*     (2006.01)
    *H04L 29/08*     (2006.01)
    *G09C 1/00*     (2006.01)
    *H04W 12/04*     (2009.01)

(52) U.S. Cl.
    CPC ...... *H04L 47/2441* (2013.01); *H04L 47/2483* (2013.01); *H04L 63/061* (2013.01); *H04L 67/2819* (2013.01); *H04L 69/22* (2013.01); *H04W 12/04031* (2019.01); *H04L 63/062* (2013.01); *H04L 63/166* (2013.01); *H04L 67/42* (2013.01)

(56) References Cited

U.S. PATENT DOCUMENTS

| | | | | |
|---|---|---|---|---|
| 9,002,018 | B2* | 4/2015 | Wilkins | ........... H04L 9/006 |
| | | | | 380/281 |
| 9,253,663 | B2* | 2/2016 | Raleigh | ........... H04W 24/02 |
| 2004/0109455 | A1 | 6/2004 | Jouppi et al. | |
| 2006/0048212 | A1* | 3/2006 | Tsuruoka | ........... H04L 9/0866 |
| | | | | 726/4 |
| 2007/0078986 | A1* | 4/2007 | Ethier | ........... H04L 65/1069 |
| | | | | 709/227 |
| 2010/0135287 | A1* | 6/2010 | Hosain | ........... H04L 47/10 |
| | | | | 370/389 |
| 2010/0232370 | A1 | 9/2010 | Jing et al. | |
| 2011/0231659 | A1 | 9/2011 | Sinha et al. | |
| 2011/0264905 | A1* | 10/2011 | Ovsiannikov | ..... H04L 29/08792 |
| | | | | 713/151 |
| 2012/0263041 | A1* | 10/2012 | Giaretta | ........... H04L 47/2441 |
| | | | | 370/236 |
| 2014/0140213 | A1* | 5/2014 | Raleigh | ........... H04L 67/2804 |
| | | | | 370/235 |

OTHER PUBLICATIONS

Braden, R. et al., "Resource ReSerVation Protocol (RSVP)", IETF Network Working Group; RFC 2205, Sep. 1997, 1-112.
Hancock, R. et al., "Next Steps in Signaling (NSIS): Framework", IETF Network Working Group, RFC 4080, Jun. 2005, 1-50.
Roskind, Jim, "Multiplexed Stream Transport Over UDP", QUIC: Quick UDP Internet Connections, Apr. 2012, 1-49.

* cited by examiner

METHODS AND FIRST, SECOND AND NETWORK NODES FOR MANAGING TRAFFIC CHARACTERISTICS

TECHNICAL FIELD

Embodiments herein relate to communication networks, such as telecommunication networks and computer networks. In particular, methods and a first node, a second node and a network node for managing traffic characteristics of one or more packets on a connection between the first node and the second node are disclosed. Moreover, corresponding computer programs and carriers therefor are disclosed.

BACKGROUND

Internet technology is based on the best-effort paradigm. To fulfill the specific Quality of Experience (QoE) needs of certain applications specific network treatment of their traffic may be required. Such specific network treatment is typically referred to as traffic differentiation.

There are a number of resource sharing methods that may be used for traffic differentiation, which are known in the art. All of these resource sharing methods require that a network entity that performs traffic differentiation knows about a specific traffic characteristics to fulfil. A commonly used way to infer this in current Internet Service Providers (ISPs) is so called Deep Packet Inspection (DPI)-based methods. These methods parse fields on the Internet Protocol (IP) and transport layers but also recognize application related information above transport layer. One can distinguish the DPI function, which inspects characteristic signature, e.g. key string, binary sequence, etc., from Deep Flow Inspection (DFI) function. The DFI function analyzes statistical characteristic and connection behavior of traffic flows, to identify an application. A simplified version of DPI is Shallow Packet Inspection (SPI), which inspects only the packet header, e.g., IP addresses, port numbers or higher level protocol fields.

There are also a number of ways the applications may reveal the required treatment of their traffic. The applications can for example reveal the treatment:
 by marking fields, e.g., DiffServ CodePoints (DSCP), Request For Comments (RFC)-4594 in the IP packet headers;
 by using some kind of signaling. Both off-path and on-path, out-band or in-band signaling is possible. In 3rd Generation Partnership Project (3GPP) mobile network, receiver/receive (Rx) interface has been defined to allow interaction between Internet Content Providers (ICPs) and ISPs using Diameter protocol. However, currently few ICPs have support for the Diameter protocol. Considering ICP is more familiar with XML based protocol, 3GPP is working on the solutions for an Extensible Markup Language (XML) based protocol, e.g. SOAP, Restful HTTP, etc., over Rx interface between the Application Function (AF) and the Policy and Charging Rules Function (PCRF). Internet Engineering Task Force (IETF) has also standardized a few signaling protocols, like the on-path, out-of-band Respondez s'il Vous Plait (RSVP) (RFC2205) or Next Steps In Signaling (NSIS), Request For Comments (RFC) 4080.

Traffic differentiation based on packet markings at the network layer, such as with DiffServ, FlowLabel etc., has been limited to single-domain agreements, because of the fact that these packet markings may be easily modified across network domains. Signalling-based solutions for resource reservation have not become popular, mostly because of deployment problems. So operators currently use DPI/DFI/SPI based methods for traffic differentiation. In general, a 5-tuple based traffic identification is sufficient, e.g. the operators and content providers may agree on what ports to use for certain traffic. In the case of client subscriptions for differentiated services, it is possible that the treatment required for a certain 5-tuple is indicated by the client e.g., by DSCP-marking the uplink traffic, e.g., the ACK packets for the same flows; this can then be detected by SPI and the corresponding Quality of Service (QoS) treatment applied for the downlink packets.

There are currently, however, a few trends in networking that have an impact on current practice of operator services.

One relates to the privacy of communication. Accelerated by the recent pervasive monitoring attempts revealed, more and more traffic is sent end-to-end encrypted. One relevant example is the recently finalized Hypertext Transfer Protocol (HTTP) 2.0 protocol in IETF, which assumes de facto encryption using Transport Layer Security (TLS) over Transport Control Protocol (TCP).

Another change relates to the multiplexing of traffic, i.e. multiplexing steams onto one connection. In the case of best-effort handling at the bottleneck, traffic multiplexing between the same endpoints allows for resource sharing that is more aligned with the QoE-needs of the different streams sharing the same connection. This is why HTTP2.0 also uses the multiplexing paradigm. Similarly, the recently proposed next-generation transport protocol by Google, Quick User Datagram Protocol Internet Connections (QUIC) is also based on the multiplexing paradigm. Another example is Web-"Real Time Communication" (RTC), which multiplexes audio, video streams and potential file transfers onto the same User Datagram Protocol (UDP) connection.

It is obvious that DPI/FPI/SPI methods are hardly applicable for encrypted and multiplexed traffic. The same is valid for the signaling based solutions. While assuming, for example, that a voice and a video stream are multiplexed into the same video conference connection, the endpoint should then practically signal for each packet separately which (voice or video) packet requires the treatment for voice of video, respectively, which is a non-scaling solution. The multiplexing requires the ability to signal the required treatment on sub-flow level, e.g., by packet markings.

One could imagine a scenario where the some existing network control solution, e.g., NSIS signaling is used to convey information about which DSCP should be used for which packet markings. A disadvantage is, however, that QoS treatment would have a limited effect on a neighboring domain, due to the uncertainty of using DSCP markings across borders between network domains.

SUMMARY

An object may be to find a solution, which may overcome, or at least mitigate, the above mentioned disadvantage.

According to a first aspect, the object is achieved by a method, performed by a first node, for managing characteristics, e.g. quality of service, delay/loss, for a stream, including one or more packets. Thus, there is provided a method, performed by the first node, for managing traffic characteristics of one or more packets on a connection between the first node and a second node, wherein the connection is provided via a network node interconnecting the first and second nodes. The first node exchanges, with the network node, traffic characteristic semantics and a common key for encryption of a traffic characteristic value to be applied for the one or more packets on the connection, wherein the traffic characteristic semantics include the traffic characteristic value and an associated characteristic for the one or more packets. The first node sends the traffic characteristic value and the common key to the second node. The first node exchanges, with the second node, payload including one or more packets over the connection, wherein information about the traffic characteristic value is included in a transport header of each packet carrying the payload.

According to a second aspect, the object is achieved by a method, performed by a network node, for managing a stream, including one or more packets, on a connection, e.g. in the transport layer. The stream may be managed with respect to treatment, such as priority, in relation to one or more other streams on the connection. Thus, there is provided a method, performed by a network node, for managing traffic characteristics of one or more packets on a connection between a first node and a second node. The network node exchanges, with the first node, traffic characteristics semantics and a common key for encryption of a traffic characteristics value to be applied for the one or more packets on the connection, wherein the traffic characteristics semantics include the traffic characteristics value and an associated characteristic for the one or more packets. The network node checks and applies the traffic characteristics value according to service policies of the network node.

According to a third aspect, the object is achieved by a method, performed by a second node, for managing characteristics for a stream, including one or more packets. Thus, there is provided a method, performed by the second node, for managing traffic characteristics of one or more packets on a connection between the second node and a first node, wherein the connection is provided via a network node interconnecting the first and second nodes. The second node receives, from the first node, a common key for encryption of a traffic characteristics value to be applied for the one or more packets on the connection, and traffic characteristics semantics, including the traffic characteristics value. The second node exchanges, with the first node, payload including one or more packets over the connection, wherein information about the traffic characteristic value is included in a transport header of each packet carrying the payload.

According to a further aspect, the object above is achieved by a first node configured to manage traffic characteristics of one or more packets on a connection between the first node and a second node, wherein the connection is provided via a network node interconnecting the first and second nodes. The first node is configured to exchange, with the network node, traffic characteristic semantics and a common key for encryption of a traffic characteristic value to be applied for the one or more packets on the connection, wherein the traffic characteristic semantics include the traffic characteristic value and an associated characteristic for the one or more packets. The first node is further configured to send the traffic characteristic value and the common key to the second node. Moreover, the first node is configured to exchange, with the second node, payload including one or more packets over the connection, wherein information about the traffic characteristic value is included in a transport header of each packet carrying the payload.

According to a still further aspect, the object above is achieved by a network node configured to manage traffic characteristics of one or more packets on a connection between a first node and a second node. The network node is configured to exchange, with the first node, traffic characteristics semantics and a common key for encryption of a traffic characteristics value to be applied for the one or more packets on the connection, wherein the traffic characteristics semantics include the traffic characteristics value and an associated characteristic for the one or more packets. The network node is further configured to check and apply the traffic characteristics value according to service policies of the network node.

According to yet a further aspect, the object above is achieved by a second node configured to manage traffic characteristics of one or more packets on a connection between the second node and a first node, wherein the connection is provided via a network node interconnecting the first and second nodes. The second node is configured to receive, from the first node, a common key for encryption of a traffic characteristics value to be applied for the one or more packets on the connection, and traffic characteristics semantics, including the traffic characteristics value. The second node is configured to exchange, with the first node, payload including one or more packets over the connection, wherein information about the traffic characteristic value is included in a transport header of each packet carrying the payload.

Moreover, according to further aspects, the object is achieved by computer programs and carriers for computer programs, which correspond to the aspects above.

Embodiments herein disclose a solution for traffic differentiation for the cases when streams with different QoS needs, or traffic requirements/characteristics, are multiplexed into the same transport connection. End-to-end encryption may be used for the payload of the streams.

According to the embodiments herein a traffic characteristics value, or traffic characteristic identifier (TCID), in the transport protocol header for each packet describes required network treatment of that packet in the direction of the packet. The traffic characteristics value may be authenticated and/or encrypted to protect against tampering. The network domain(s), e.g. the network node, in the path, e.g. the connection between the first and second node, apply the QoS treatment according to the information conveyed by the traffic characteristics value. The semantics of traffic characteristics value and credentials for security context is negotiated between the network domain, e.g. the network node, and clients, such as the first and/or second node, prior to sending the traffic marked in this way. If needed, the traffic characteristics value and a common key can also be transferred between the paying party and the traffic sender, in the case when the paying party receives the traffic to be differentiated.

The methods herein may be described as traffic reveal methods, performed by the end-points, for revealing required, or desired, treatment of traffic, e.g. which QoS is set for the traffic, or stream, based on transport layer header field markings, e.g. the traffic characteristics value, that may be used for domain-specific traffic handling. The revealing of the traffic characteristics value means that information in the transport layer header may carry information about the traffic characteristics value.

Authentication of the traffic characteristics value to protect against tampering in intermediate domains is provided in some embodiments. Encryption of the traffic characteristics value is also possible to reduce traffic characteristics significance to the authorized network domain(s). Encryption prevents that intermediate nodes can read the traffic characteristics value. The encryption also provides a means for the ISP to have a control of and an authorization of the entities using a certain service. Otherwise, in scenarios when e.g. a content provider sets the same TCID for a subscriber that is not intended to use that service would become possible. This would represent a burden for the ISP which may have to filter out these cases.

The fact that the semantics of the used traffic characteristics value between the operator/ISP, such as the network node, and the other party, such as the first and/or second node, it has agreement with may be negotiated in advance and may be valid for a longer time period, e.g., hours, days. In other examples, the semantics may be predetermined.

Advantageously, the proposed methods are capable of controlling domain specific QoS handling with a traffic characteristics value, which is originated outside of the domain. This means that the traffic characteristics value is specified in the transport layer rather than in the network layer. QoS treatment, as known in the art, are specified in the network layer is thus valid on a per domain, or network domain, basis.

If the traffic characteristics value is authenticated and encrypted, it cannot be read outside of the domain, and not dropped or modified by nodes of other domains. Thus, the methods allows for traffic differentiation in various business scenarios, involving also agreements with non-adjacent network domains. This is an advantage compared to current marking and SPI-based methods, where information about the treatment may be lost at the domain borders.

Packet-level traffic characteristics values allow for proper differentiation of streams multiplexed into the same connection. The traffic characteristics value also ensures the QoS/QoE handling along the path of the packets, i.e., load sharing does not imply any potential problems.

The embodiments herein allow for end-to-end encryption for higher-level protocol layers and content, for which purpose the known DPI/DFI methods would be difficult to use.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
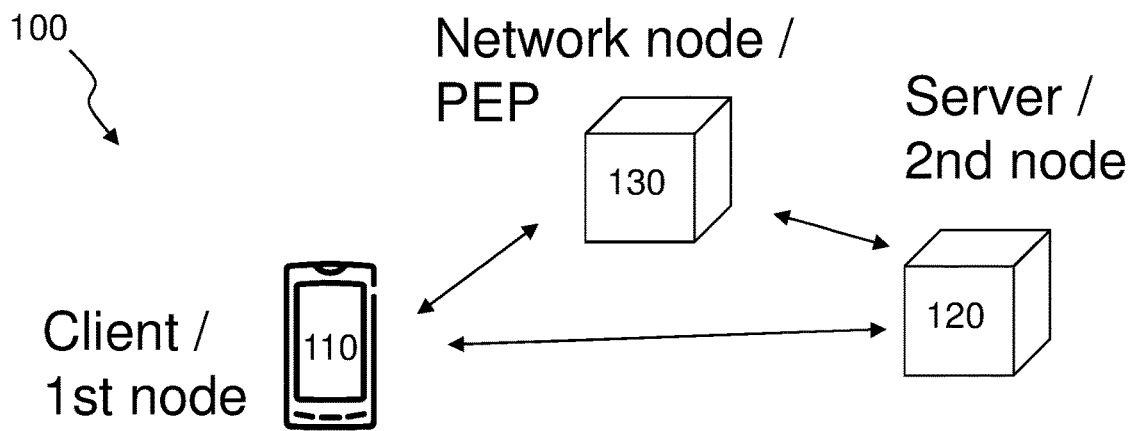
FIG. 1 is a schematic overview of an exemplifying system in which embodiments herein may be implemented.

Throughout the following description similar reference numerals have been used to denote similar features, such as actions, steps, nodes, elements, units, modules, circuits, parts, items or the like, when applicable. In the Figures, features that appear in some embodiments are indicated by dashed lines.

FIG. 1 depicts an exemplifying communications system 100 in which embodiments herein may be implemented. In this example, the communications system 100 comprises a first node 110, a second node 120 and a network node 130.

The first node 110 may be a client, such as a paying party who may pay for possibility of special traffic handling in a network, illustrated by the network node 130. The first node 110 may include a mediator application, or client mediator application, which performs one or more of the actions described in connection with FIG. 3 below.

The second node 120 may be a server, which may provide a service to which the client may wish to establish a connection via the network node 130. In some examples, the server may also be a so called paying party. The paying party is an entity, such as the first or second node, that has an agreement with the network node for specific traffic handling. This means that in some examples the first node 110 may be the client and the second node 120 may be the server and in other examples the first node 110 may be the server and the second node 120 may be the client.

The first and second nodes 110, 120 may be referred to as end points of an end-2-end connection, e.g. between respective transport layers, denoted 'client transport' and 'server transport' in FIG. 6, which is described in more detail below. The 'client transport' and 'server transport' may be operated by, e.g. executed or run in, the first and second node 110, 120. Hence, as used herein the terms "layer", "protocol" refer to software components which may be dedicated to handle certain functions. E.g. transport layer handles reliability of segments transferred on e.g. an end-2-end connection.

The network node 130 may be part of a network on which the end-2-end connection may rely. The network node 130 may be a Policy Enforcement Point (PEP), which thus ensures that certain traffic characteristics may be fulfilled.

The network may be a wired or wireless network, such as a Long Term Evolution (LTE) system or an evolution thereof. In other examples, the network may be any radio network, such as any 3GPP cellular communication system, such as a 5G network, a Wideband Code Division Multiple Access (WCDMA) network, a Global System for Mobile communication (GSM network) or the like, or any wired network, such as Asymmetric Digital Subscriber Line (ADSL) access network, Cable Internet Access network or the like.

As used herein, the term "first node" and/or "second node" may refer to a user equipment, a mobile phone, a cellular phone, a Personal Digital Assistant (PDA) equipped with or without radio communication capabilities, a smartphone, a laptop or personal computer (PC) equipped with an internal or external mobile broadband modem or other means for network connection, a tablet PC with capabilities for connection to a network, a portable electronic radio communication device or the like.

In order to better appreciate the following description in conjunction with FIG. 3, some terms and expressions will be explained here.

Interpretation and Relevance of Traffic Characteristics Value

There may be a large number of traffic characteristics targets to reveal, e.g., related to packet delay/loss targets, bandwidth utility curves, etc. For a certain agreement scenario, all these targets may be categorized into a few traffic characteristics classes described by a combination of the above parameters. These traffic classes can be identified by standard or pre-agreed traffic characteristics values. The traffic characteristics value may be referred to as a marking, a traffic characteristics identifier (TCID) or the like. The traffic characteristics values may be similar to a QoS Class Identifier (QCI) according to 3GPP QoS architecture, which CQI incorporates a multitude of QoS parameters. The traffic class identifies some kind of QoS treatment, which is somewhat different from the DSCP semantics, referring to absolute or relative per-hop treatment.

A difference between the traffic characteristics value and DSCP is, however, that the traffic characteristics value is available in the packet end-2-end, which makes it possible that the information reaches a non-neighboring domain. The integrity of the traffic characteristics value may be ensured by authentication, and it may also be encrypted so that only the relevant entities, e.g. a Policy Enforcement Point (PEP), which has obtained a suitable key, referred to as 'common key' herein, can identify information about traffic characteristics, while DSCPs can be, or generally are, reset at the domain borders, i.e. between different network domains defined in a network layer (IP network) underlying the transport layer.

There could be cases when the traffic characteristics values should have generic significance. In this case it should be sent as open information, while authentication is still possible, and some standardization of a so called traffic characteristics semantics would be needed. In the other cases, the meaning of the traffic characteristics value and potentially the credentials to encrypt it have to be agreed between the network and (at least one of) the endpoints. Examples on how to do this are found below.

As used herein, the traffic characteristics value is a generic identifier for mapping values relating to traffic characteristics, which may have been agreed between a network and an end-point, to traffic characteristics of the network.

Examples for Traffic Characteristics Value

There are different examples how to convey the traffic characteristics to the network domain.

Stream Identities

One possibility is that there is a stream identity indication in the transport layer protocol header, and end-points and the network negotiate in advance which stream identities to use to a certain traffic class. For example, voice stream should get a Stream ID in the range 1 . . . 15. The range should be sufficiently large to embed the number of potential streams requiring the same network treatment in the same connection. In this example, the stream identities are mapped to e.g. QoS, QCI, or the like. The mapping may, in this and other examples, be realized by means of a table, matrix or vector.

Generally, this means that when transport layer header includes the traffic characteristic value, the information about the traffic characteristic value may be the traffic characteristic value.

Stream Group Identities

Some steams might be grouped to stream groups for e.g. privacy reasons. In this case the number of streams in a group is not revealed to further protect privacy.

Dedicated Protocol Field

Figure 2:
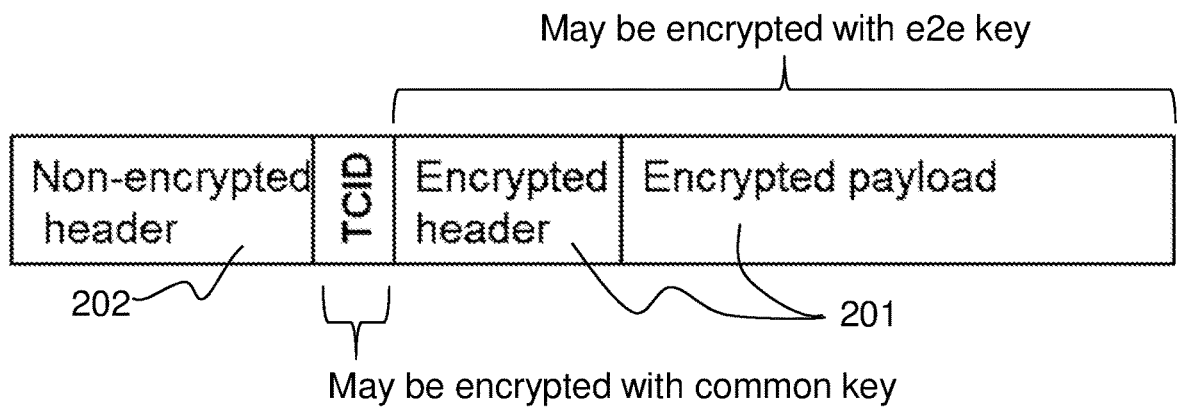
FIG. 2 is a block diagram illustrating an exemplifying transport layer header.

Another example is that the traffic characteristics value is a dedicated few-bits field in the transport layer packet header identifying the traffic class for the marked packet in the direction of the packet, as shown in FIG. 2. This is useful when the endpoints would like to hide stream identities because of privacy reasons. In this case, the traffic characteristics value may be interpreted as a common traffic characteristics identifier for all streams that require the same network treatment. Thus, FIG. 2 illustrates an exemplifying placement of a field for the traffic characteristics value in the transport protocol header.

There are two sub-cases of this scenario. With reference to FIG. 2, the header may contain end-to-end encrypted information 201 and also open information 202. The field is either authenticated, e.g., via a checksum in the encrypted part, or encrypted in such a way that is can be decrypted both by the receiving endpoint, such as the first node 110, and the network node 130. This should not compromise the security of the payload. Thus, encryption of the traffic characteristics value requires other encryption keys, such as the common key below, than those encryption keys used for encryption of the payload.

Note that for all scenarios assuming some business agreements, or where the traffic characteristics semantics have been negotiated, it is preferred to use encryption of the traffic characteristics value. This provides a means for the ISP to have a control and authorization of the entities using a certain service. Otherwise, scenarios when e.g., a content provider sets the same traffic characteristics value for a subscriber that is not intended to use that service would become possible, and would represent a policy burden for the ISP to filter out these cases.

Combination of Two or More Protocol Fields

A further example is to use a combination of more than one protocol field to identify the traffic characteristics value. For example, a stream identifier may be combined with a dedicated traffic-class field; the latter would indicate the treatment needed, while the former would enable separation of different streams that require a given treatment, e.g., two video streams, in the same connection.

End-2-End-DSCP

IP-protocol, as known in the art, has a DSCP-field in the network layer. The DSCP-field is used for traffic differentiation. This field is assumed to be set locally by a DiffServ edge router and is only valid within the domain. In an end-2-end use-case, an authentication header can be added to protect the DSCP-field from modification. The authentication header could be part of IP-SEC, in the network layer, or on transport TOP-layer, in the transport layer. If the DSCP-header is modified, it is may be detected by a receiver, such as the first and/or second node 110, 120, of the packet.

This means that when the transport layer include an authentication, such as Cyclic Redundancy Check (CRC) sum, to protect DSCP-fields in the network layer, the information about the traffic characteristic value may be an authentication header in the transport header of said each packet, wherein the traffic characteristic value is a DiffServ CodePoint "DSCP" value.

To find the original DSCP-value, in case of a changed DSCP-value, different DSCP-values can be tested until the authentication matches the DSCP-value. A system, i.e. an entity, such that the first node 110, the network node 130 and the like, that are interested in the DSCP-value and knows about the authentication can do such test. The DSCP-values that matches authentication is the original DSCP-value. Then the correct one can be inserted in to the IP-header.

If the end-system, e.g. the first or second node 110, 120, gets a priori knowledge, i.e. knowledge in advance, about potential DSCP-values, the burden of matching the DSCP-values is decreasing because only a few selected DSCP-values need to be tested to find one that matches the authentication, such as the CRC sum.

In other examples, a flow identifier "FlowID" in IP-v6 may be used as an alternative to the DSCP-field as described above.

Figure 3:
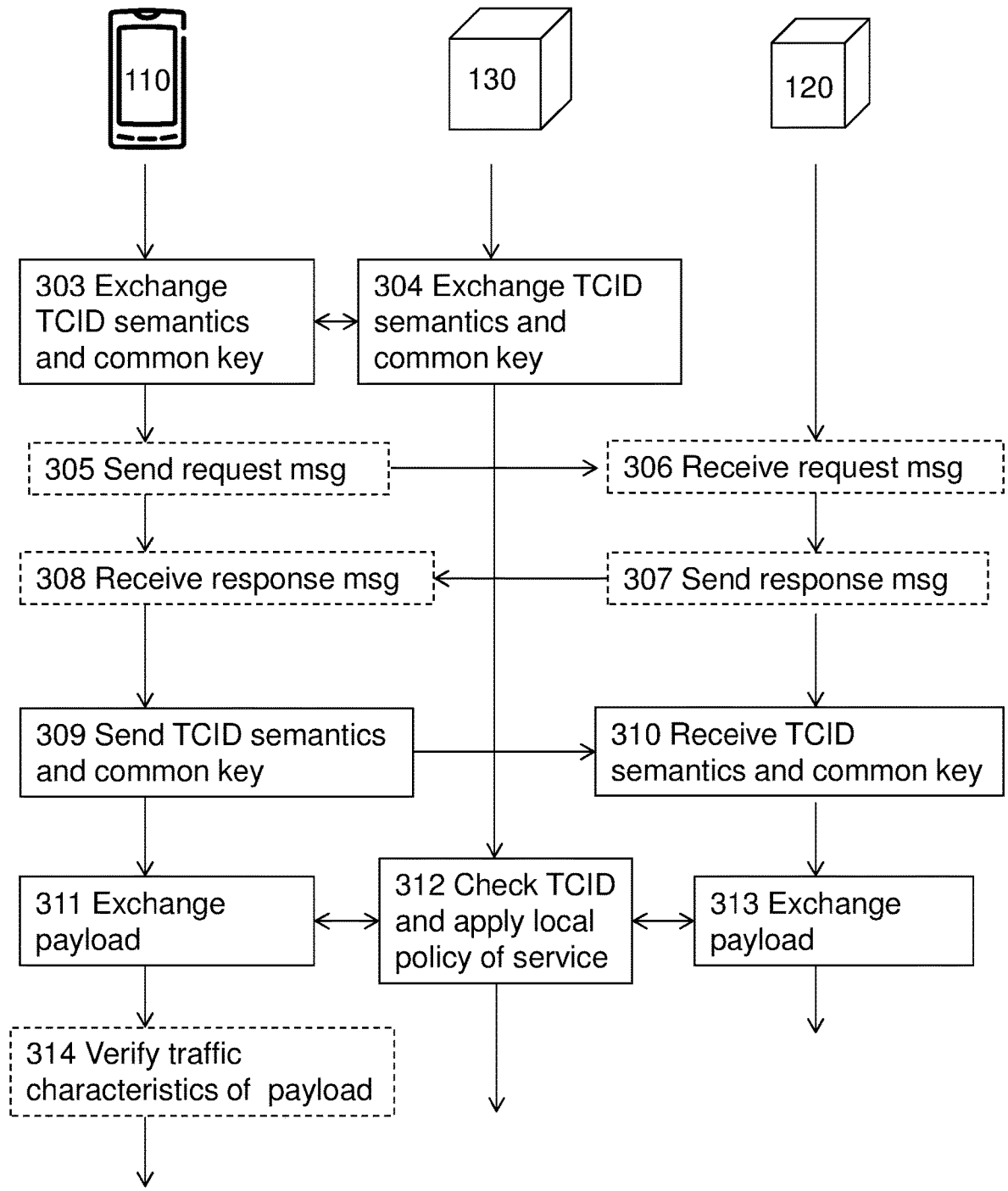
FIG. 3 is a combined signaling and flowchart illustrating the methods herein.

FIG. 3 illustrates exemplifying methods when implemented in the communication system 100 of FIG. 1. In this example, the connection may carry multiple streams, e.g. a first stream and a second stream. The first stream may have a first traffic characteristics value that is different from a second traffic characteristics value of the second stream. Each stream may include one or more packets.

In this example, the first node 110 performs a method for managing traffic characteristics of one or more packets on a connection between the first node 110 and the second node 120, wherein the connection is provided via a network node 130 interconnecting the first and second nodes 110, 120. The network node 130 performs a method for managing traffic characteristics of one or more packets on the connection between the first node 110 and the second node 120. The second node 120 performs a method for managing traffic characteristics of one or more packets on the connection.

In some examples, a payload, or payload data, is to be transferred between the first and second nodes 110, 120. The payload may be encrypted with a key for encryption of the payload, e.g. a payload key, which may preferably be different from the common key discussed herein. The payload key may be an end-2-end key, since it is known to the end points, i.e. the first and second nodes. As mentioned elsewhere, the key may be one key or it may be a pair of keys, i.e. a private and public key.

The traffic characteristic value may comprise, or indicate, a local policy of service and/or quality of service values. Alternatively or additionally, the traffic characteristic semantics may comprise a set of traffic characteristic values. This means that the traffic characteristics semantics may, as mentioned above, reduce the number of possible traffic characteristics values and thus facilitate matching of a traffic characteristics value as mentioned above at the end of section "End-2-end-DSCP".

The following actions may be performed in any suitable order.

Action 303

In order for the first node 110 to obtain a common understanding of how to interpret the traffic characteristics value(s) applied by the network node 130, the first node 110 and the network node 130 exchanges traffic characteristics semantics.

This means that the first node 110 exchanges, e.g. sends or receives, with the network node 130, traffic characteristic semantics and a common key for encryption of a traffic characteristic value to be applied for the one or more packets on the connection. The traffic characteristic semantics include the traffic characteristic value and an associated characteristic for the one or more packets.

In a first example, the traffic characteristic semantics include a set of traffic characteristic values.

Note that this exchange may be mediated by one or more further nodes. For example, a web proxy may be interfacing to a CNM APP then a Policy Decision Point (PDP) is interfacing with the web proxy and the PDP. See more about CNM APP and PDP below.

Action 304

Correspondingly to action 303, the network node 130 may exchange, e.g. send or receive traffic characteristics semantics and the common key with the first node 110.

As is understood from action 303 and 304, which describes so called client communication (elaborated below), any one of the first node 110 or the network node 130 may initiate the process of exchanging, i.e. sending or receiving, the traffic characteristics semantics and the common key. See section "TCID semantics and key negotiation" and its sub-sections below. Therefore, the traffic characteristics semantics may be determined by the first node 110 or the network node 130. Moreover, the common key may be determined by the first node 110 or the network node 130. An advantage with these actions is that the first node 110 and the network node 130 may dynamically determine the traffic characteristics semantics and/or the common key, i.e. the traffic characteristics semantics and/or the common key are not static or pre-determined in a standard specification.

The client communication may thus set up the common key to be used for encryption of the traffic characteristics value in the transport protocol header.

Action 305

The first node 110 may send a request message, or 'msg' for short, for requesting a connection, e.g. in the transport layer, to be setup with the second node 120. The request message may be sent to the second node 120.

Action 306

Subsequent to action 305, the second node 120 may accordingly receive the request message from the first node 110.

Action 307

In response to action 306, the second node 120 may send a response message. The response message may include credentials, such as keys to be used for encryption of streams to be sent on the connection. In particular, the credentials may be used for encryption of payload data and a related header portion. The connection may between the respective transport layers of the first and second nodes 110, 120. The response message may be sent to the first node 110.

Action 308

Subsequent action 307, the first node 110 may receive the response message from the second node 120.

In action 307 and 308, a connection between the first node 110 and the second node 120 may have been established.

Action 309

The first node 110 sends the traffic characteristic value and the common key to the second node 120.

In some examples, the first node 110 sends the traffic characteristics semantics, i.e. the traffic characteristics semantics and the common key to the second node 120. See also section "Key and TCID exchange with the other endpoint". The traffic characteristics value includes the value to be used as traffic characteristics value for the payload to be sent on the connection. In some special case, the traffic characteristics semantics may include only one traffic characteristics value to be used when sending the payload.

Referring to the first example, it may be that the first node 110 sends a sub-set of the set of traffic characteristics values to the second node 120 in this example. Thereby, only one or more traffic characteristics values to be used for sending payload on the connection are revealed to the second node 120.

Action 310

Subsequent to action 309, the second node 120 receives, from the first node 110, a common key for encryption of a traffic characteristics value to be applied for the one or more packets on the connection, and traffic characteristics semantics, including the traffic characteristics value.

In some examples, the second node 120 receives the traffic characteristics semantics and the common key from the first node 110. See also section "Key and TCID exchange with the other endpoint".

Action 311

Generally, the first node 110 exchanges, with the second node 120, payload including one or more packets over the connection, wherein information about the traffic characteristic value is included in a transport header of each packet carrying the payload.

In some examples, action 311 means that the first node 110 receives the payload from the second node 120. Alternatively, action 311 means that the first node 110 generates the traffic characteristic value included in the transport header, and then sends the payload to the second node 120.

As a further way of expressing action 311, the first node 110 transfers, e.g. receives or sends, payload between the first node 110 and the second network node 120 via the network node 130.

When the first node 110 sends the payload, the first node 110 sets the traffic characteristics value as desired, e.g. as determined by a client APP of the first node 110. The client APP may also be referred to as a client mediator application. When the TCID is set it means that a value is assigned to the traffic characteristics value. The value may be mapped to traffic characteristics, e.g. policies in network layer. The client APP is mentioned further below.

Action 312

The network node 130 receives the traffic characteristics value and the payload, from the first and/or second node 110, 120. As an example, in the transport layer, a segment including the traffic characteristics value and the payload may be received by the network node 130.

The network node 130 checks and applies the traffic characteristics value according to service policies of the network node 130. In this manner, traffic differentiation may be achieved.

The network node 130 interprets the traffic characteristics value to convert the traffic characteristics value to traffic characteristics applying in the network, i.e. a local policy of service corresponding to, or mapped to, the traffic characteristics value as given by the traffic characteristics semantics.

Action 313

The second node 120 exchanges, with the first node 110, payload including one or more packets over the connection.

Similarly to action 311, action 313 may mean that second node 120 receives the payload from the first node 110. Alternatively, action 313 may mean that the second node 120 generates the traffic characteristic value included in the transport header; and sends the payload to the second node 120.

Expressed somewhat differently, the second node 120 transfers traffic characteristic value and the payload. E.g. when the second node 120 sends the payload, the second node 120 also sends the traffic characteristics value received in action 310. The traffic characteristics value may be encrypted using the common key.

Action 314

Now returning to the actions performed by the first node 110. In some examples, the first node 110 may check that the traffic characteristics value set for the one or more packets is obeyed by the second node 120. That is to say, the first node 110 may wish to check that the second node 120 has marked the one or more packets of the payload with the correct traffic characteristic value.

Thus, subsequent to action 311, the first node 110 may verify that a further traffic characteristic value of packets of the payload corresponds to the traffic characteristic value sent to the second node 120.

Expressed differently, when the first node 110 has received the traffic characteristic value and the payload the first node 110 may verify that the received traffic characteristic value, i.e. a value thereof, corresponds to the traffic characteristic value, i.e. a value thereof, sent in action 309.

According to the embodiments above, the initial client communication sets up the traffic characteristics semantics and the common key to be used in the transport layer functions. This communication may preferably be performed over a secure association, e.g. secure connection or link.

In the following more detailed description, the first node 110 is exemplified by a client, which may include a Client Network Mediator Application (CNM APP), a client APP and a client transport, i.e. operating a transport layer. The network node 130 is exemplified by a network, which may include a Policy Enforcement Point and an Adaption Proxy. Moreover, the second node 120 is exemplified by a server, which may include a server APP and a server transport, i.e. operating a transport layer. Note also that traffic characteristics value is referred to as TCID.

TCID Semantics and Key Negotiation

Further elaborating on actions 303 and 304 above, the TCID semantics and its encryption key have to be exchanged between the ISP and the client it has agreement with (i.e., the paying party). There are various methods of how this exchange could be done, e.g., by using mechanisms for network control, e.g., NSIS signaling. The TCID semantics may provide a mapping between one or more TCID values and their corresponding respective traffic characteristic expressed in a local policy, e.g. according to a network layer of the network node 130. The mapping may e.g. be provided in the form of a table, matrix, vector or the like.

In the following, the endpoints and the network use a proprietary protocol for TCID semantics and key negotiation. Two example cases are: server SLA case and client subscription case.

Server SLA Case (Traffic from Server)

In this case, i.e. when action 311 includes receiving payload and action 313 includes sending payload, the server APP initiates security setup and exchanges TCID semantics and key for TCID. These should be separate for each Server for privacy reasons. Note that the agreed set of parameters may be valid for several sessions, e.g., for a certain time period.

Figure 4:
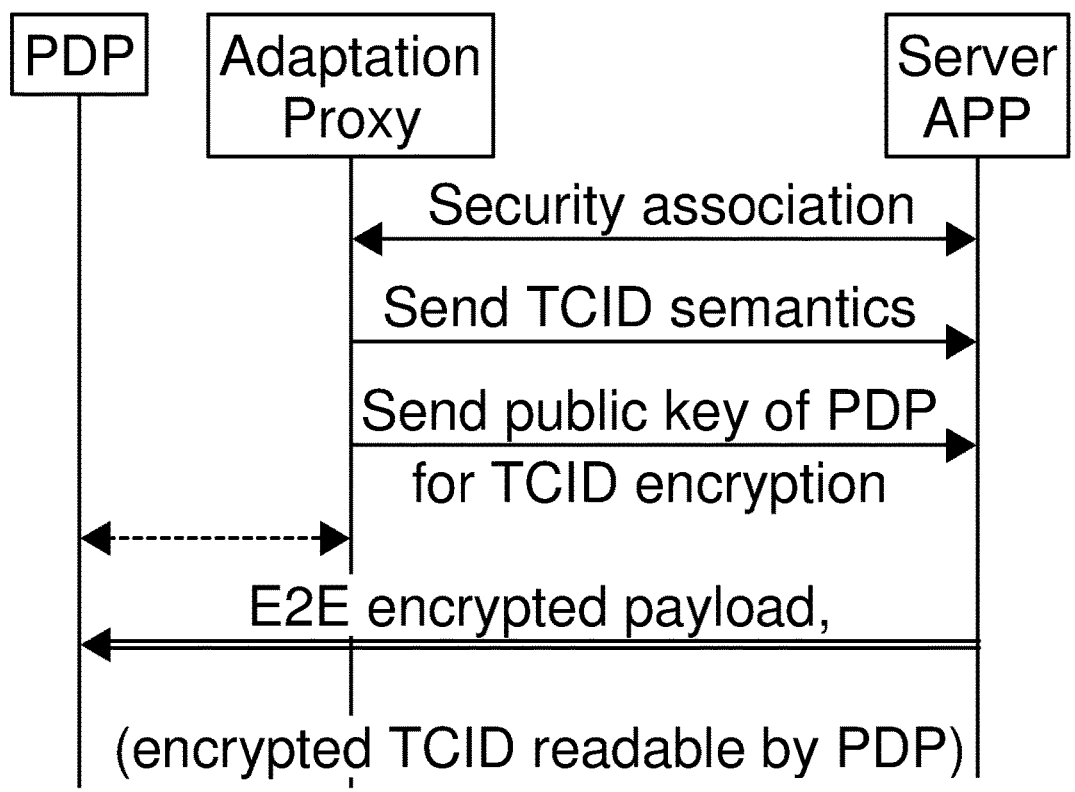
FIG. 4 is another combined signaling and flowchart illustrating embodiments herein.

An example signaling diagram is shown in FIG. 4. An Adaptation Proxy may be used to mediate the information exchanges with the other NW nodes, e.g., PDP using e.g., HTTPS protocol with Server. PDP then selects the proper key and decrypts TCID based on source IP of Server.

A double-stroke arrow "E2E encrypted payload" corresponds to actions 311 and 313 as described in the initial part of this section. Similarly action 309 above corresponds to "send TCID semantics" and "send public key of PDP" in FIG. 4.

Client Subscription Case (Traffic from Server)

Figure 5:
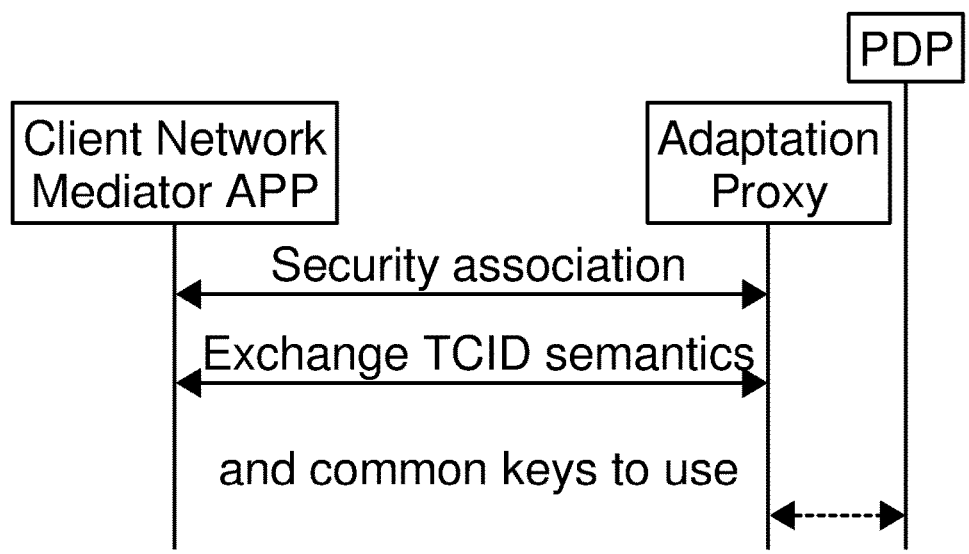
FIG. 5 is a further combined signaling and flowchart illustrating embodiments herein.

The client, i.e., the endpoint receiving the traffic may exchange the TCID semantics and credential in a similar way, see FIG. 5. It is herein proposed to use a dedicated Client Network Mediator APP (CNM APP) in Client for initiating security setup and exchange of TCID semantics and common keys with the NW Operator to decipher TCID. In case of mobile subscription, this APP may be pre-installed by the operator to the UE. Action "exchange TCID semantics" corresponds to action 303 and 304 in FIG. 3.

Key and TCID Exchange with the Other Endpoint

It has been described above how to exchange the information between the ISP, i.e. the network node 130, and the paying party, e.g. the first node 110. There are cases, however, e.g., mobile client subscriptions, when the paying party receives the traffic to be differentiated, and therefore has to send the TCID to use to the sender, i.e., the content Server.

Figure 6:
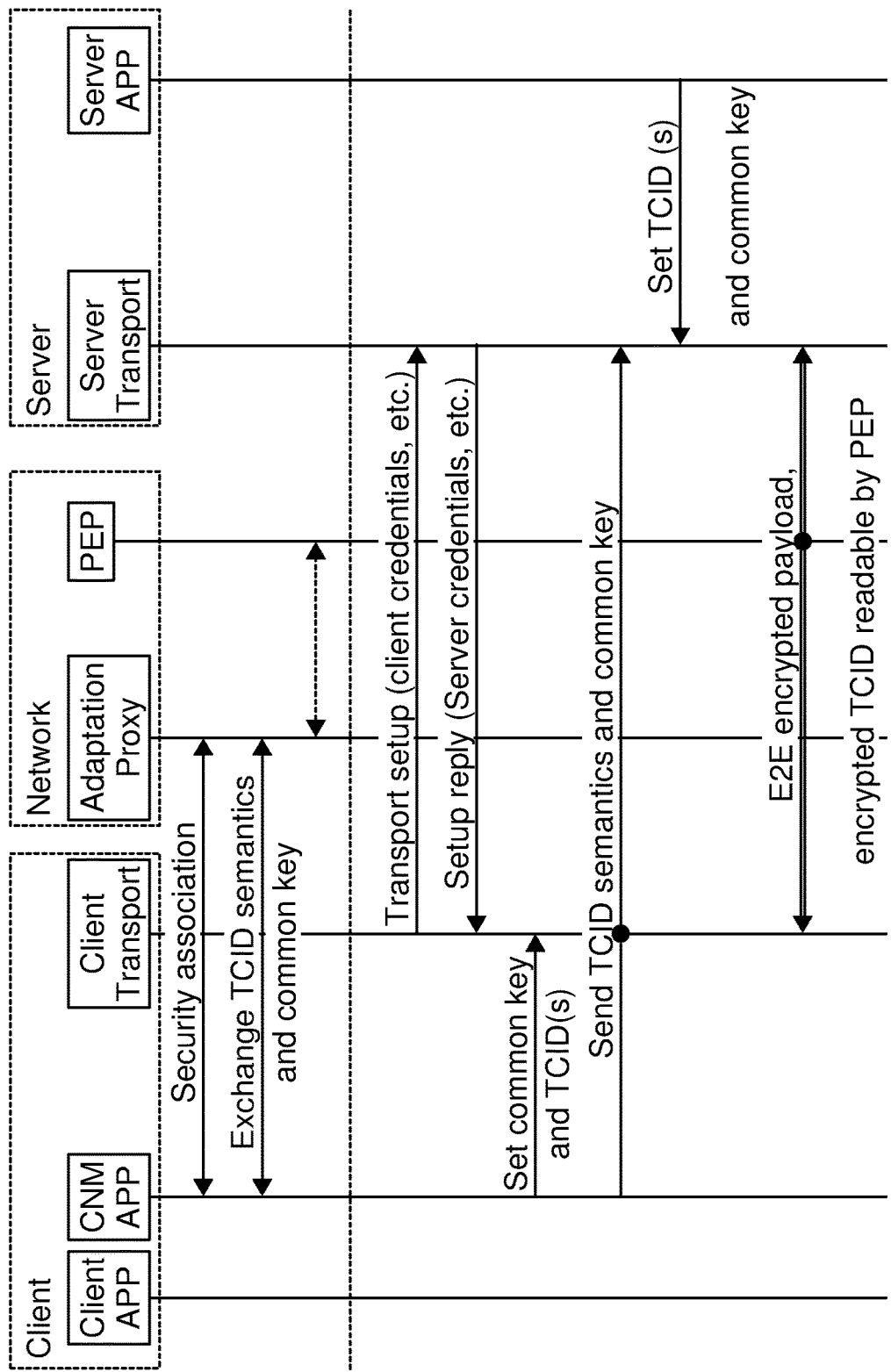
FIG. 6 is yet another combined signaling and flowchart illustrating embodiments herein.

One possibility for key and TCID exchange is depicted in FIG. 6. The first part of the chart, above the horizontal dotted line, is the client communication with the network for TCID and key negotiation as described in section "client subscription case". It is assumed (thus not shown) that the Client APP interfaces with the Client Network Mediator APP to request the TCID and common credential to use. This is then sent (not shown) to the Server APP on the application layer, e.g., via HTTP header fields. In this example, there is proposed an Application Programming Interface (API) from the Application through which the TCID and network Node credentials can be conveyed to the transport layer on the Server side, and optionally also on the client side, if it is required. At this point, the transport layer on the Server is already able to encrypt TCID in the way that it may be decrypted by both the PEP in the network and the client.

Note that the above functionality may be regrouped, i.e., transfer of credential and TCID is also possible on the transport layer. FIG. 6 illustrates example sequence diagram of how to exchange the common key and TCID between the Client and the Server when the client has agreement with the operator/ISP and the Server traffic is to be differentiates Service Differentiation in the Network Domain Based on TCID In the following, it is described how an embodiment of the solution for traffic characteristics reveal may trigger the network QoS architecture for proper traffic differentiation, assuming a 3GPP network. Note, however, that the solution is applicable to any ISP networks. For example, in a network where a DSCP-based QoS treatment is applied, the TCID values are mapped into the proper DSCP markings at the domain borders.

The simplest solution for a mobile network is shown in FIG. 6, assuming client subscription, while the Server agreement case is even more straightforward. The adaptation proxy sends the keys to use for certain users (International Mobile Subscriber Identity (IMSI) or IP address) to the PEP. For this, it may use a proprietary interface during e.g., attach.

There may be a pre-configured domain QoS to apply for certain TCID, e.g., via pre-configured bearer mappings. Thus, if the PEP can decrypt and interpret a certain TCID then it can apply the corresponding domain QoS for it.

In the case when PEP is a Traffic Determination Function (TDF), it applies packet markings, based on which the PGW chooses the proper bearer Note that this method as described above does not impact the 3GPP PCC and QoS architecture.

Figure 7:
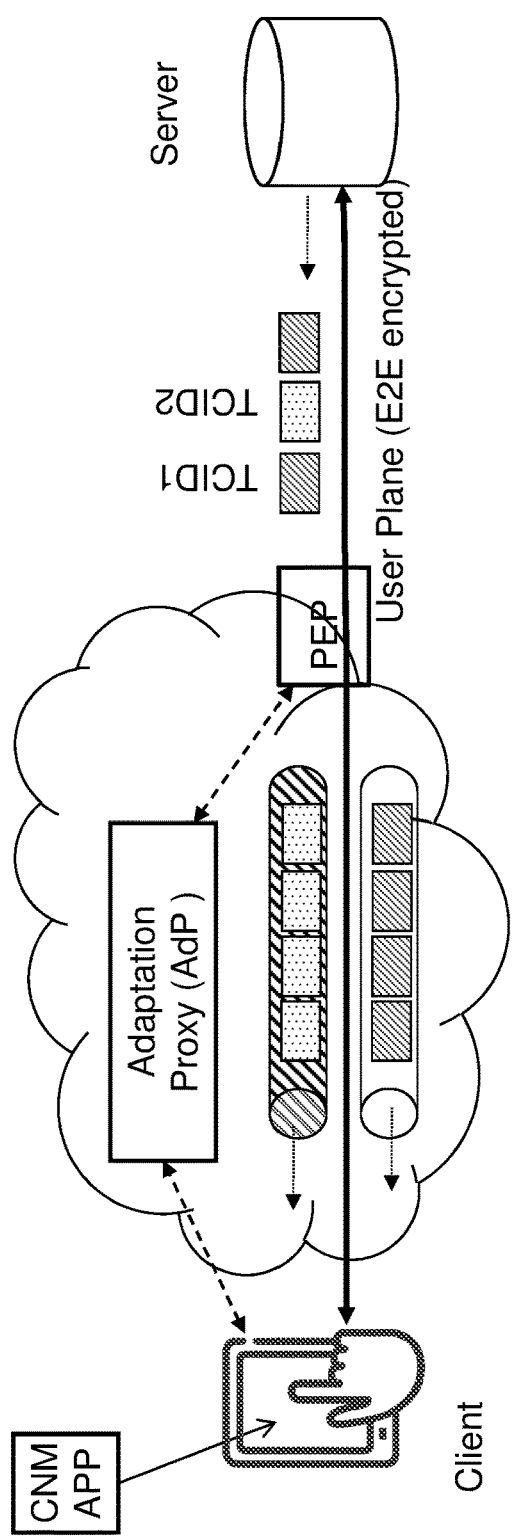
FIG. 7 is a further overview, illustrating embodiments herein.

FIG. 7 illustrates how mapping of TCID to network domain QoS, such as 3GPP QoS, may be performed.

Figure 8:
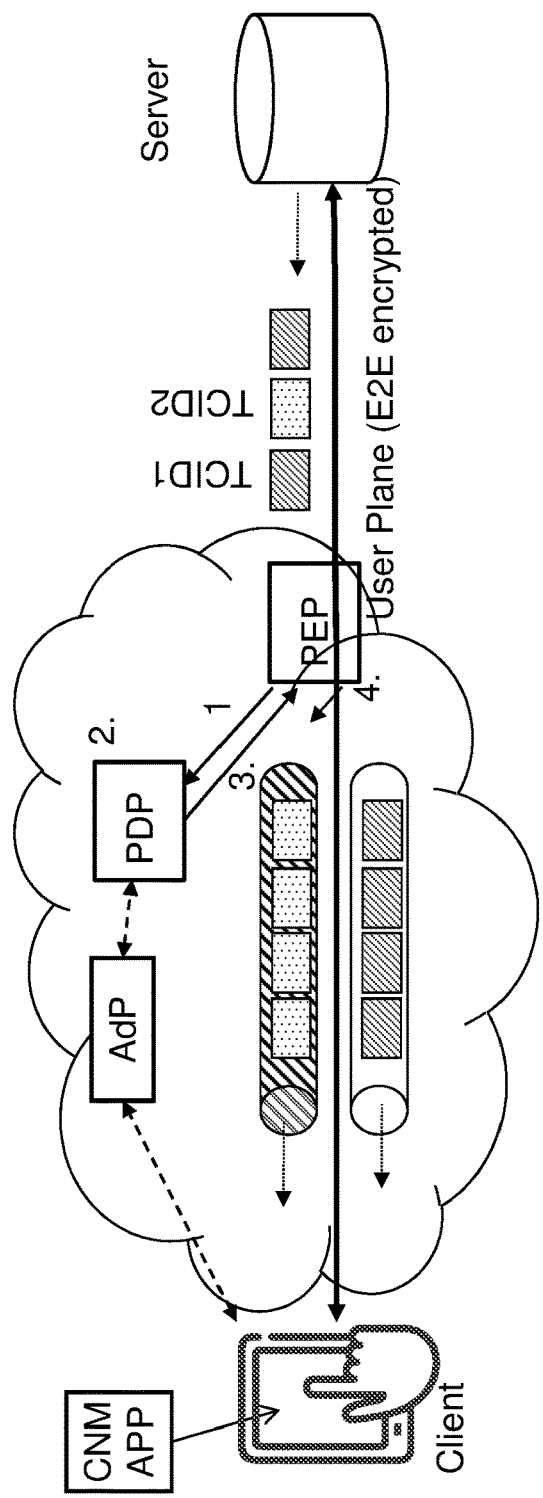
FIG. 8 is a still further overview, illustrating embodiments herein.

There is also a possibility for a more dynamic provisioning for an 'unknown' TCID, as depicted in FIG. 8. The steps are the following:

1. Policy Enforcement Point (PEP), such as part of the network node 130, informs on a new connection, including user identity and TCID
2. Policy Decision Point (PDP), such as part of the network node 130, makes policy decision on traffic treatment. This may be made by client subscription information, pre-configured rules etc.
3. PDP sends QoS decision (e.g., bearers to use) and key to decrypt the TCID field to PEP. The keys may be exchanged with client/Server as described in section "TCID semantics and key negotiation.
4. PEP applies the domain QoS in case of positive Policy decisions. This may be in form of new bearer setup, bearer modification etc.

Application for Other Scenarios

The description above assumed a single domain agreement, e.g., agreement between one ISP and one content provider or client, respectively. In the following, different extensions and variations of the above scenario are presented. The present concept is applicable also in these extensions and variations.

Multi-Domain Scenarios

Figure 9:
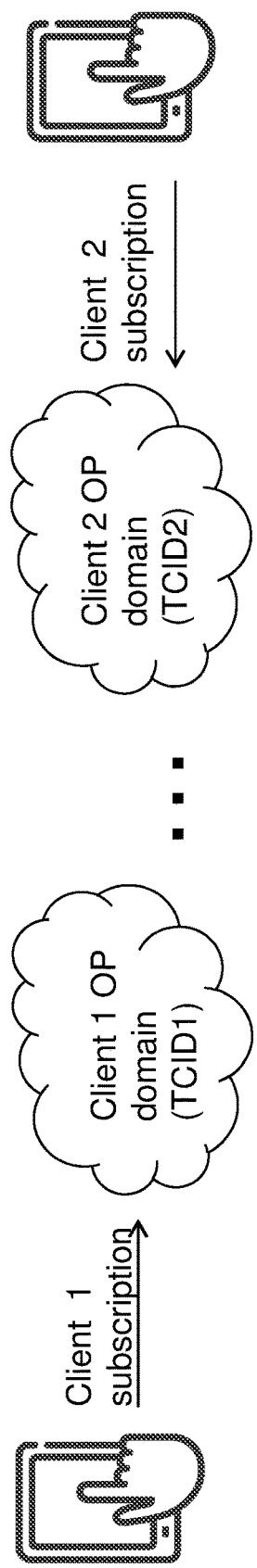
FIG. 9 is another overview, illustrating embodiments herein.

A special case for client subscription is when there are multiple Operators along the path, each in charge with traffic differentiation within his own domain, see FIG. 9. A typical peer-to-peer case is when two UEs communicating from different mobile networks e.g., using Web-RTC communication.

This scenario may be regarded as two single-domain scenarios, each domain using its own QoS mapping based on its proper TCID set controlled by its own clients.

Figure 10:
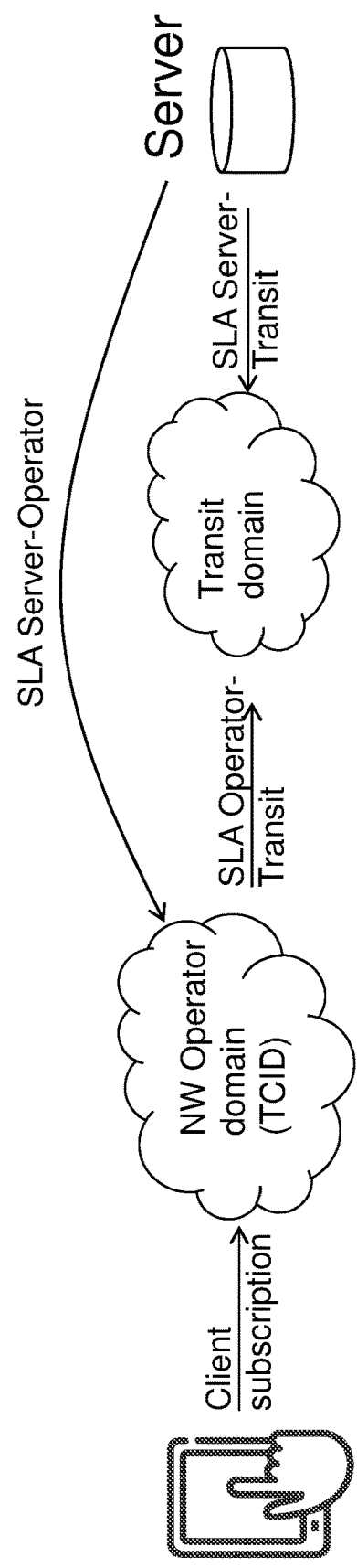
FIG. 10 is yet another overview, illustrating embodiments herein.
Figure 11:
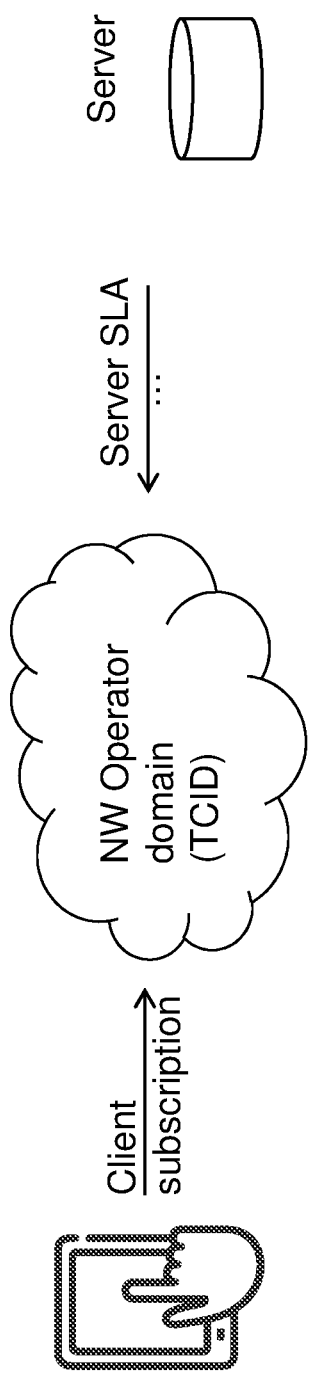
FIG. 11 is still another overview, illustrating embodiments herein.

Another typical multi-domain case is when there are also other domains (AKA transit domains) along the communication path, as shown in FIG. 10. Depending on whether there is client subscription of Server SLAs, the following example solution is proposed:

Client subscription case: an additional SLA should be set between the operator and Transit domain(s), i.e., the client continues to 'see' one subscription only. This is because having business relation with clients and transit domains is unfeasible Server SLA case: two solutions are feasible, i.e.,
Server Domain to Transit SLA, or
Operator-Transit SLA Server Upgrade A special case is when an ISP, such as the network node 130, has agreement with both the clients and some content providers. See FIG. 11. This makes it possible that for some of the content, the Server 'upgrades' the treatment required by the client. Whether there is an upgrade becomes apparent from the encryption of TCID (assuming separate Server or Client credentials); this also allows for proper charging.

Future Scenarios

Figure 12:
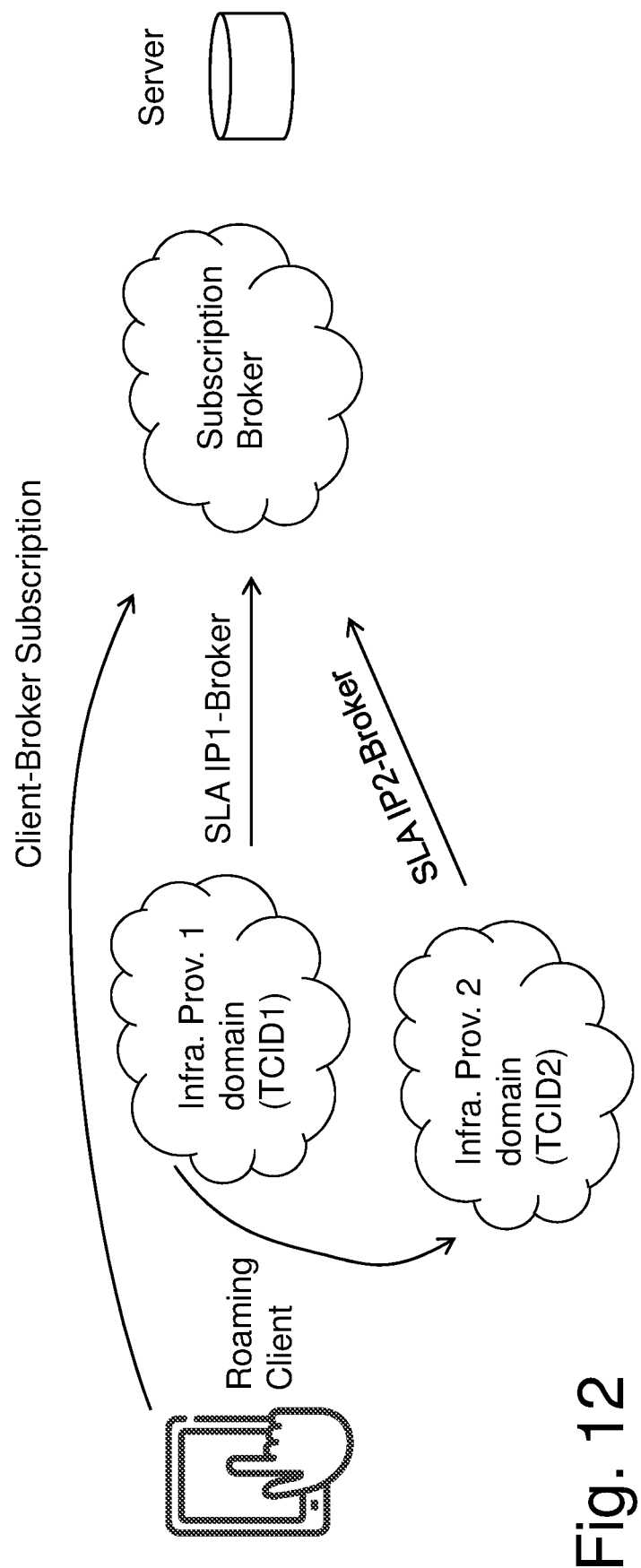
FIG. 12 is a yet further overview, illustrating embodiments herein.

A likely future scenario is when the subscribers are no longer tied to specific operators. Instead, there will be infrastructure providers the UEs may freely roam in, and charging and customer care will be provided by separate subscription 'brokers'. Such a scenario is shown in FIG. 12.

The solution proposed supports also this scenario with the difference that TCID and Key exchange between the clients and infrastructure providers should be mediated by the Subscription Broker. That is, the Adaptation Proxy belongs to the Broker and not to the Operator. The communication between the Adaptation Proxy and Operator policy nodes may use Rx or other standardized interface in the long run.

Figure 13:
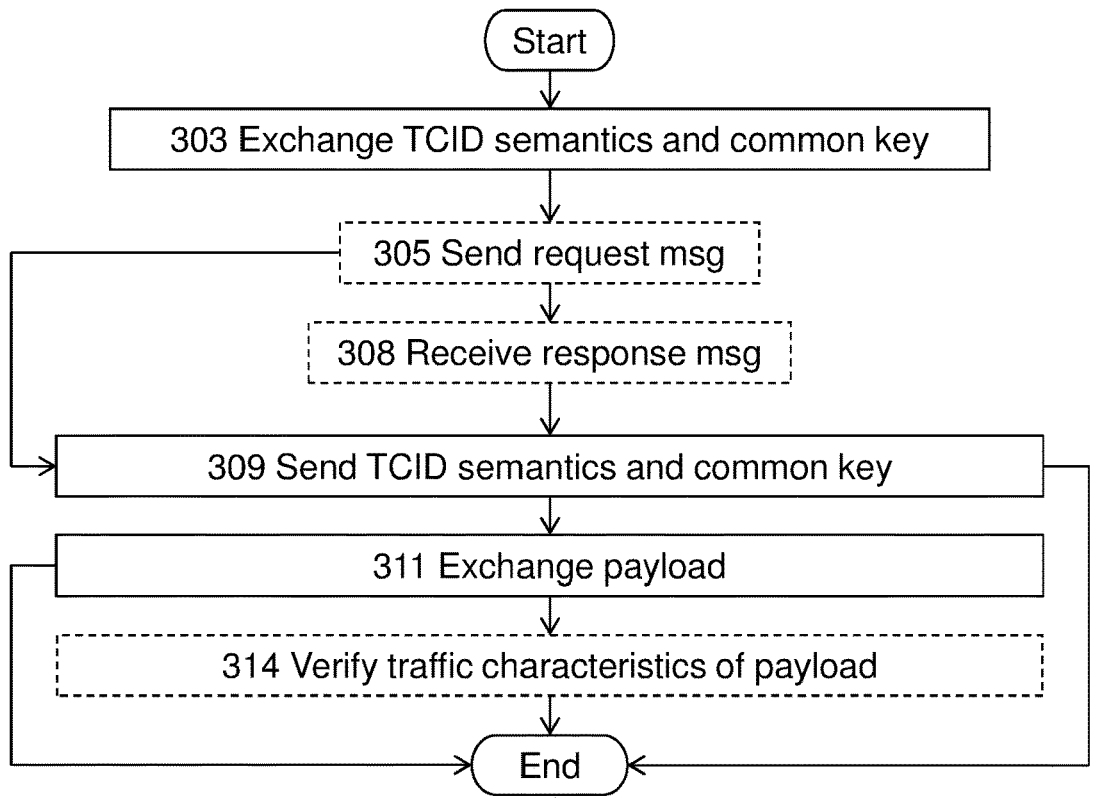
FIG. 13 is a flowchart illustrating embodiments of the method in the first node.

In FIG. 13, an exemplifying, schematic flowchart of the method in the first node 110 is shown. The same reference numerals as used in connection with FIG. 3 have been applied to denote the same or similar actions. The first node 110 performs a method for managing traffic characteristics of one or more packets on a connection between the first node 110 and a second node 120, wherein the connection is provided via a network node 130 interconnecting the first and second nodes 110, 120.

As mentioned, the traffic characteristic value may comprise a local policy of service and/or quality of service values, and/or wherein the traffic characteristic semantics may comprise a set of traffic characteristic values.

The information about the traffic characteristic value may be the traffic characteristic value.

The information about the traffic characteristic value may be an authentication header in the transport header of said each packet, wherein the traffic characteristic value is a DiffServ CodePoint "DSCP" value.

The following action may be performed in any suitable order.

Action 303

The first node 110 exchanges, with the network node 130, traffic characteristic semantics and a common key for encryption of a traffic characteristic value to be applied for the one or more packets on the connection, wherein the traffic characteristic semantics include the traffic characteristic value and an associated characteristic for the one or more packets.

Action 305

The first node 110 may send a request message, or 'msg' for short, for requesting a connection, e.g. in the transport layer, to be setup with the second node 120.

Action 308

Subsequent action 305, the first node 110 may receive a response message, in response to the request, from the second node 120.

Action 309

The first node 110 sends the traffic characteristic value and the common key to the second node 120.

The first node 110 may include a mediator application, which performs the exchanging 303 of the traffic characteristic semantics and the common key, and the sending 309 of the traffic characteristic value and the common key.

Action 311

The first node 110 exchanges, with the second node 120, payload including one or more packets over the connection, wherein information about the traffic characteristic value is included in a transport header of each packet carrying the payload.

The exchanging 311 of the payload may comprise receiving the payload from the second node 120.

Alternatively, the exchanging 311 of the payload may comprise generating the traffic characteristic value included in the transport header; and sending the payload to the second node 120.

Action 314

The first node 110 may verify that a further traffic characteristic value of packets of the payload corresponds to the traffic characteristic value sent to the second node 120.

Figure 14:
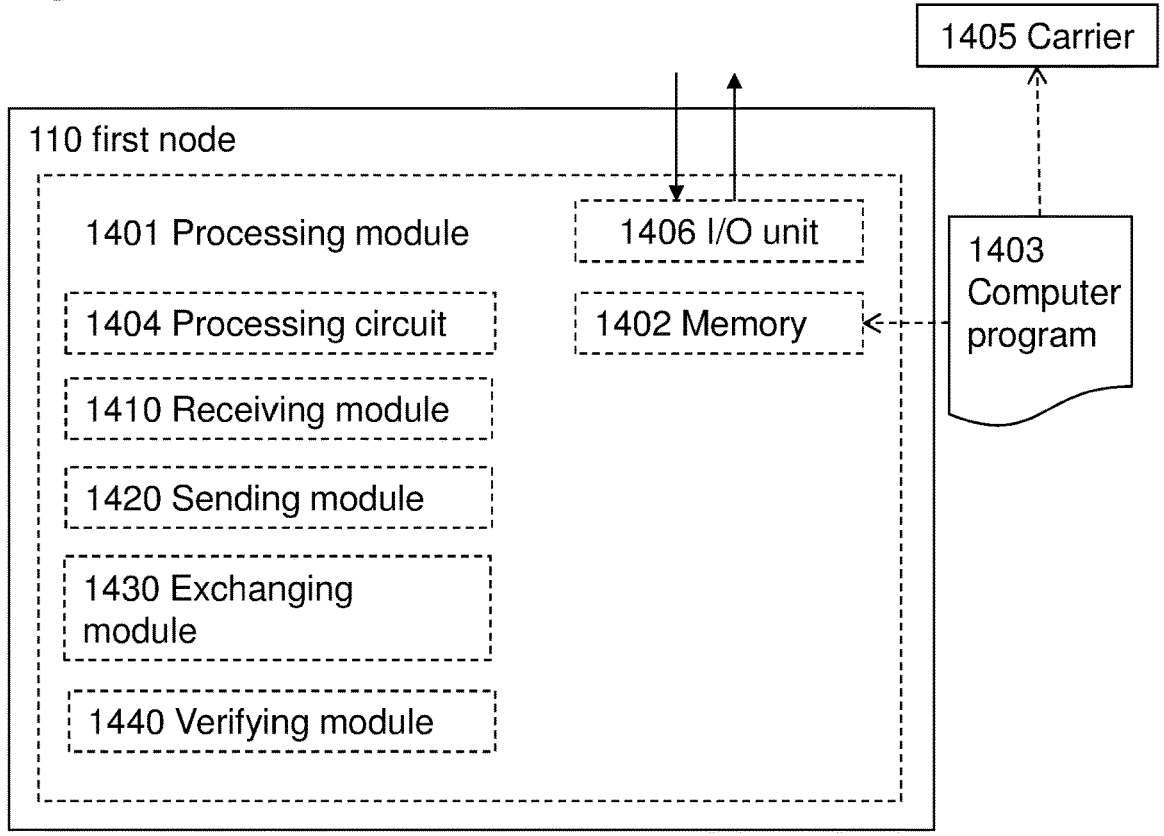
FIG. 14 is a block diagram illustrating embodiments of the first node.

With reference to FIG. 14, a schematic block diagram of the first node 110 is shown. The first node 110 is configured to manage traffic characteristics of one or more packets on a connection between the first node 110 and a second node 120, wherein the connection is provided via a network node 130 interconnecting the first and second nodes 110, 120.

The first node 110 may comprise a processing module 1401, such as a means, one or more hardware modules and/or one or more software modules for performing the methods described herein.

The first node 110 may further comprise a memory 1402. The memory may comprise, such as contain or store, a computer program 1403.

According to some embodiments herein, the processing module 1401 comprises, e.g. 'is embodied in the form of' or 'realized by', a processing circuit 1404 as an exemplifying hardware module. In these embodiments, the memory 1402 may comprise the computer program 1403, comprising computer readable code units executable by the processing circuit 1404, whereby the first node 110 is operative to perform the methods of FIG. 3 and/or FIG. 13.

In some other embodiments, the computer readable code units may cause the first node 110 to perform the method according to FIGS. 3 and/or 13 when the computer readable code units are executed by the first node 110.

FIG. 14 further illustrates a carrier 1405, comprising the computer program 1403 as described directly above. The carrier 1405 may be one of an electronic signal, an optical signal, a radio signal, and a computer readable medium.

In some embodiments, the processing module 1401 comprises an Input/Output (I/O) unit 1406, which may be exemplified by a receiving module and/or a sending module as described below when applicable.

In further embodiments, the first node 110 and/or the processing module 1401 may comprise one or more of a receiving module 1410, a sending module 1420, an exchanging module 1430, and a verifying module 1440 as exemplifying hardware modules. In other examples, the aforementioned exemplifying hardware module may be implemented as one or more software modules. These modules are configured to perform a respective action as illustrated in e.g. FIG. 13.

Therefore, according to the various embodiments described above, the first node 110 is, e.g. by means of the processing module 1401 and/or any of the above mentioned modules, operative to, e.g. is configured to, perform the method of FIG. 13.

In more detail, the first node 110, the processing module and/or the exchanging module 1430 is operative to, such as configured to, exchange, with the network node 130, traffic characteristic semantics and a common key for encryption of a traffic characteristic value to be applied for the one or more packets on the connection, wherein the traffic characteristic semantics include the traffic characteristic value and an associated characteristic for the one or more packets.

The first node 110, the processing module and/or the sending module 1420 is operative to, such as configured to, send the traffic characteristic value and the common key to the second node 120.

Moreover, the first node 110, the processing module and/or the exchanging module 1430 is operative to, such as configured to, exchange, with the second node 120, payload including one or more packets over the connection, wherein information about the traffic characteristic value is included in a transport header of each packet carrying the payload.

The first node 110, the processing module and/or the verifying module 1440 may be operative to, such as configured to, verify that a further traffic characteristic value of packets of the payload corresponds to the traffic characteristic value sent to the second node 120.

The first node 110, the processing module and/or the exchanging module 1430 may be operative to, such as configured to, exchange the payload by receiving the payload from the second node 120. Alternatively, the first node 110, the processing module and/or the exchanging module 1430 may be operative to, such as configured to, exchange the payload by generating the traffic characteristic value included in the transport header; and sending the payload to the second node 120.

As mentioned, the first node 110 may include a mediator application, which is configured to exchange the traffic characteristic semantics and the common key, and send the traffic characteristic value and the common key.

The traffic characteristic value may comprise a local policy of service and/or quality of service values, and/or wherein the traffic characteristic semantics may comprise a set of traffic characteristic values.

The information about the traffic characteristic value may be the traffic characteristic value.

The information about the traffic characteristic value may be an authentication header in the transport header of said each packet, wherein the traffic characteristic value is a DiffServ CodePoint "DSCP" value.

Figure 15:
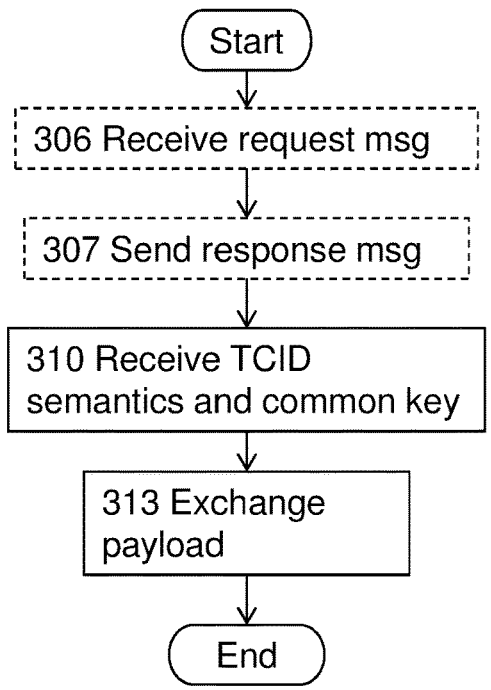
FIG. 15 is a flowchart illustrating embodiments of the method in the second node.

In FIG. 15, an exemplifying, schematic flowchart of the method in the second node 120 is shown. The same reference numerals as used in connection with FIG. 3 have been applied to denote the same or similar actions. Thus, the second node 120 performs a method for managing traffic characteristics of one or more packets on a connection between the second node 120 and a first node 110, wherein the connection is provided via a network node 130 interconnecting the first and second nodes 110, 120.

The following action may be performed in any suitable order.

Action 306

Subsequent to action 305, the second node 120 may accordingly receive a request message from the first node 110.

Action 307

In response to action 306, the second node 120 may send a response message. The response message may include credentials, such as keys to be used for encryption of streams to be sent on the connection. In particular, the credentials may be used for encryption of payload data and a related header portion. The connection may between the respective transport layers of the first and second nodes 110, 120.

Action 310

The second node 120 receives, from the first node 110, a common key for encryption of a traffic characteristics value to be applied for the one or more packets on the connection, and traffic characteristics semantics, including the traffic characteristics value.

Action 313

The second node 120 exchanges, with the first node 110, payload including one or more packets over the connection, wherein information about the traffic characteristic value is included in a transport header of each packet carrying the payload.

As mentioned, the exchanging of the payload may comprise receiving the payload from the first node 120, or the exchanging 313 of the payload may comprise: generating the traffic characteristic value included in the transport header; and sending the payload to the second node 120.

As mentioned, the traffic characteristic value may comprise a local policy of service and/or quality of service values, and/or wherein the traffic characteristic semantics may comprise a set of traffic characteristic values.

The information about the traffic characteristic value may be the traffic characteristic value.

The information about the traffic characteristic value may be an authentication header in the transport header of said each packet, wherein the traffic characteristic value is a DiffServ CodePoint "DSCP" value.

Figure 16:
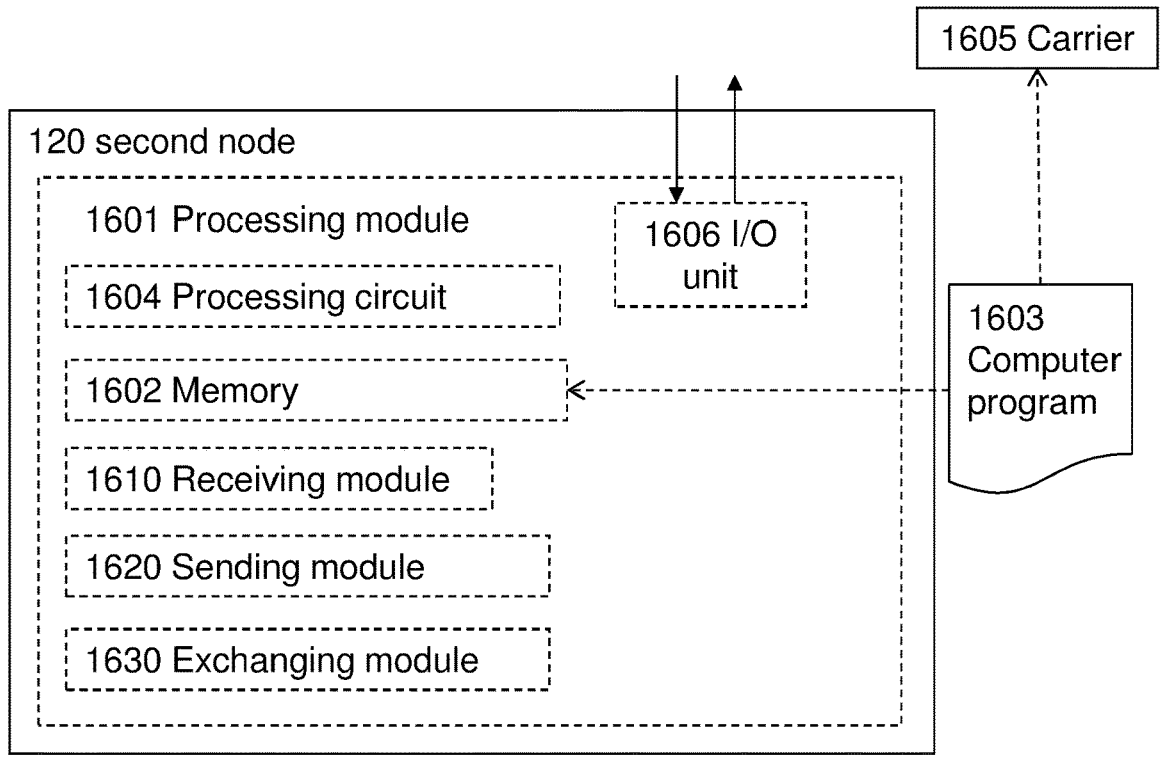
FIG. 16 is a block diagram illustrating embodiments of the second node.

With reference to FIG. 16, a schematic block diagram of the second node 120 is shown. Thus, the second node 120 is configured to manage traffic characteristics of one or more packets on a connection between the second node 120 and a first node 110, wherein the connection is provided via a network node 130 interconnecting the first and second nodes 110, 120.

The second node 120 may comprise a processing module 1601, such as a means, one or more hardware modules and/or one or more software modules for performing the methods described herein.

The second node 120 may further comprise a memory 1602. The memory may comprise, such as contain or store, a computer program 1603.

According to some embodiments herein, the processing module 1601 comprises, e.g. 'is embodied in the form of' or 'realized by', a processing circuit 1604 as an exemplifying hardware module. In these embodiments, the memory 1602 may comprise the computer program 1603, comprising computer readable code units executable by the processing circuit 1604, whereby the second node 120 is operative to perform the methods of FIG. 3 and/or FIG. 15.

In some other embodiments, the computer readable code units may cause the second node 120 to perform the method according to FIGS. 3 and/or 15 when the computer readable code units are executed by the second node 120.

FIG. 16 further illustrates a carrier 1605, comprising the computer program 1603 as described directly above. The carrier 1605 may be one of an electronic signal, an optical signal, a radio signal, and a computer readable medium.

In some embodiments, the processing module 1601 comprises an Input/Output (I/O) unit 1606, which may be exemplified by a receiving module and/or a sending module as described below when applicable.

In further embodiments, the second node 120 and/or the processing module 1601 may comprise one or more of a receiving module 1610, a sending module 1620 and an exchanging module 1630 as exemplifying hardware modules. In other examples, the aforementioned exemplifying hardware module may be implemented as one or more software modules. These modules are configured to perform a respective action as illustrated in e.g. FIG. 15.

Therefore, according to the various embodiments described above, the second node 120 is, e.g. by means of the processing module 1601 and/or any of the above mentioned modules, operative to, e.g. is configured to, perform the method of FIG. 15.

In more detail, the second node 120, the processing module 1601 and/or the receiving module 1610 is operative to, such as configured to, receive, from the first node 110, a common key for encryption of a traffic characteristics value to be applied for the one or more packets on the connection, and traffic characteristics semantics, including the traffic characteristics value.

The second node 120, the processing module 1601 and/or the exchanging module 1630 is operative to, such as configured to, exchange, with the first node 110, payload including one or more packets over the connection, wherein information about the traffic characteristic value is included in a transport header of each packet carrying the payload.

The second node 120, the processing module 1601 and/or the exchanging module 1630 may be operative to, such as configured to, exchange the payload by receiving the payload from the first node 120. Alternatively, the second node 120, the processing module 1601 and/or the exchanging module 1630 may be operative to, such as configured to, exchange the payload by generating the traffic characteristic value included in the transport header; and sending the payload to the second node 120.

As mentioned, the traffic characteristic value may comprise a local policy of service and/or quality of service values, and/or wherein the traffic characteristic semantics may comprise a set of traffic characteristic values.

The information about the traffic characteristic value may be the traffic characteristic value.

The information about the traffic characteristic value may be an authentication header in the transport header of said each packet, wherein the traffic characteristic value is a DiffServ CodePoint "DSCP" value.

Figure 17:
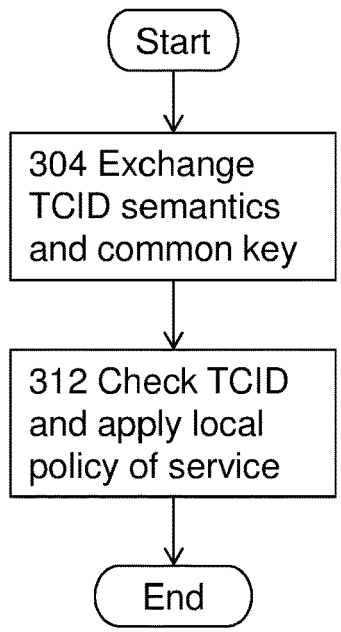
FIG. 17 is a flowchart illustrating embodiments of the method in the network node.

In FIG. 17, an exemplifying, schematic flowchart of the method in the network node 130 is shown. The same reference numerals as used in connection with FIG. 3 have been applied to denote the same or similar actions. The network node 130 thus performs a method for managing traffic characteristics of one or more packets on a connection between a first node 110 and a second node 120.

The following action may be performed in any suitable order.

Action 304

The network node 130 exchanges, with the first node 110, traffic characteristics semantics and a common key for encryption of a traffic characteristics value to be applied for the one or more packets on the connection, wherein the traffic characteristics semantics include the traffic characteristics value and an associated characteristic for the one or more packets.

Action 312

The network node 130 checks and applies the traffic characteristics value according to service policies of the network node 130.

As mentioned, the traffic characteristic value may comprise a local policy of service and/or quality of service values, and/or wherein the traffic characteristic semantics may comprise a set of traffic characteristic values.

Figure 18:
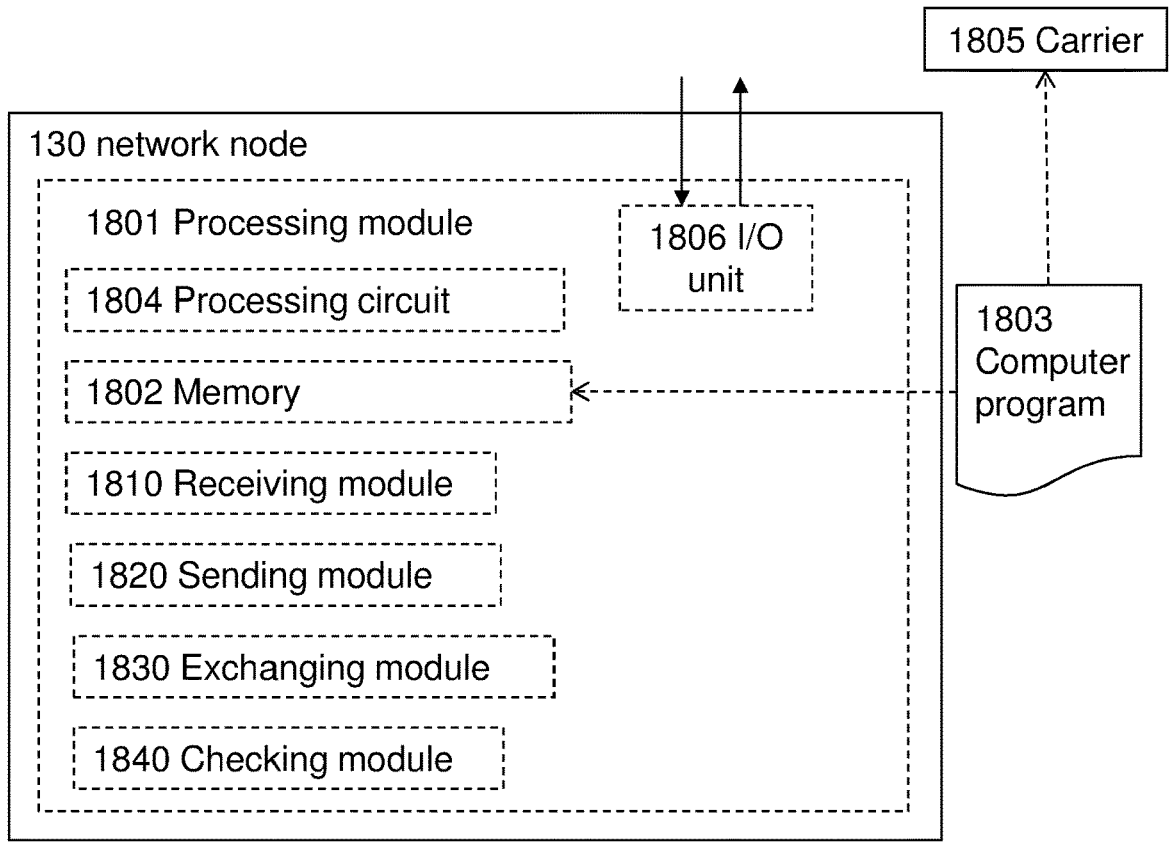
FIG. 18 is a block diagram illustrating embodiments of the network node.

With reference to FIG. 18, a schematic block diagram of the network node 130 is shown. Thus, the network node 130 is configured to manage traffic characteristics of one or more packets on a connection between a first node 110 and a second node 120.

The network node 130 may comprise a processing module 1801, such as a means, one or more hardware modules and/or one or more software modules for performing the methods described herein.

The network node 130 may further comprise a memory 1802. The memory may comprise, such as contain or store, a computer program 1803.

According to some embodiments herein, the processing module 1801 comprises, e.g. 'is embodied in the form of' or 'realized by', a processing circuit 1804 as an exemplifying hardware module. In these embodiments, the memory 1802 may comprise the computer program 1803, comprising computer readable code units executable by the processing circuit 1804, whereby the network node 130 is operative to perform the methods of FIG. 3 and/or FIG. 17.

In some other embodiments, the computer readable code units may cause the network node 130 to perform the method according to FIGS. 3 and/or 17 when the computer readable code units are executed by the network node 130.

FIG. 18 further illustrates a carrier 1805, comprising the computer program 1803 as described directly above. The carrier 1805 may be one of an electronic signal, an optical signal, a radio signal, and a computer readable medium.

In some embodiments, the processing module 1801 comprises an Input/Output (I/O) unit 1806, which may be exemplified by a receiving module and/or a sending module as described below when applicable.

In further embodiments, the network node 130 and/or the processing module 1801 may comprise one or more of a receiving module 1810, a sending module 1820, an exchanging module 1830 and a checking module 1840 as exemplifying hardware modules. In other examples, the aforementioned exemplifying hardware module may be implemented as one or more software modules. These modules are configured to perform a respective action as illustrated in e.g. FIG. 17.

Therefore, according to the various embodiments described above, the network node 130 is, e.g. by means of the processing module 1801 and/or any of the above mentioned modules, operative to, e.g. is configured to, perform the method of FIG. 15.

In more detail, the network node 130, the processing module 1801 and/or the exchanging module 1830 is operative to, such as configured to, exchange, with the first node 110, traffic characteristics semantics and a common key for encryption of a traffic characteristics value to be applied for the one or more packets on the connection, wherein the traffic characteristics semantics include the traffic characteristics value and an associated characteristic for the one or more packets.

The network node 130, the processing module 1801 and/or the checking module 1840 is operative to, such as configured to, check and apply the traffic characteristics value according to service policies of the network node 130.

As mentioned, the traffic characteristic value may comprise a local policy of service and/or quality of service values, and/or wherein the traffic characteristic semantics may comprise a set of traffic characteristic values.

As used herein, the term "processing module" may in some examples refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In these examples, the processing module is thus embodied by a hardware module. In other examples, the processing module may be embodied by a software module. Any such module, be it a hardware, software or combined hardware-software module, may be a determining means, estimating means, capturing means, associating means, comparing means, identification means, selecting means, receiving means, sending means or the like as disclosed herein. As an example, the expression "means" may be a module or a unit, such as a determining module and the like correspondingly to the above listed means.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "Number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a first node, for managing traffic characteristics of one or more packets on a connection between the first node and a second node, wherein the connection is provided via a network node interconnecting the first and second nodes, wherein the method comprises:
exchanging, with the network node, traffic characteristic semantics and a common key, wherein the traffic characteristic semantics include one or more traffic characteristic values and associated traffic characteristics for packets carrying the traffic characteristic values;
sending the one or more traffic characteristic values and the common key to the second node;
exchanging, with the second node, payload carried by the one or more packets over the connection, wherein a transport header of each packet carrying the payload indicates one of the traffic characteristic values, wherein the indication of the traffic characteristic value included in the transport header is encrypted with the common key.

2. The method of claim 1, wherein the method comprises:
verifying that a further traffic characteristic value of packets carrying the payload corresponds to the traffic characteristic value sent to the second node.

3. The method of claim 1, wherein the exchanging of the payload comprises one or both of:
receiving the payload from the second node, and
generating the traffic characteristic value indicated by the transport header; and sending the payload to the second node.

4. The method of claim 1, wherein the first node includes a mediator application, which performs the exchanging of the traffic characteristic semantics and the common key, and the sending of the one or more traffic characteristic values and the common key.

5. The method of claim 1, wherein each traffic characteristic value comprises a local policy of service value and/or quality of service value, and/or wherein the traffic characteristic semantics comprises a set of traffic characteristic values.

6. The method of claim 1, wherein the payload carried by one or more of the one or more packets is encrypted by an end-to-end key distinct from the common key.

7. The method of claim 1, wherein the transport header in one or more of the one or more packets includes a value associated with one of the traffic characteristic values, and wherein the indication of the one of the traffic characteristic values is an authentication header in the transport header of said each packet, wherein the traffic characteristic value is a DiffSery CodePoint (DSCP) value.

8. A first node configured to manage traffic characteristics of one or more packets on a connection between the first node and a second node, wherein the connection is provided via a network node interconnecting the first and second nodes, wherein the first node comprises processing circuitry comprising a processor and memory, the processing circuitry being configured to:
exchange, with the network node, traffic characteristic semantics and a common key, wherein the traffic characteristic semantics include one or more traffic characteristic values and associated traffic characteristics for packets carrying the traffic characteristic values;
send the one or more traffic characteristic values and the common key to the second node; and
exchange, with the second node, payload carried by the one or more packets over the connection, wherein a transport header of each packet carrying the payload indicates one of the traffic characteristic values, wherein the indication of the traffic characteristic value included in the transport header is encrypted with the common key.

9. The first node of claim 8, wherein the processing circuitry is configured to:
verify that a further traffic characteristic value of packets of the payload corresponds to the traffic characteristic value sent to the second node.

10. The first node of claim 8, wherein the processing circuitry is configured to exchange the payload by one or both of:
receiving the payload from the second node, and
generating the traffic characteristic value indicated by the transport header; and sending the payload to the second node.

11. The first node of claim 8, wherein the processing circuitry is configured to exchange the traffic characteristic semantics and the common key, and send the one or more traffic characteristic values and the common key.

12. The first node of claim 8, wherein each traffic characteristic value comprises a local policy of service value and/or quality of service value, and/or wherein the traffic characteristic semantics comprises a set of traffic characteristic values.

13. The first node of claim 8, wherein the payload carried by one or more of the packets is encrypted by an end-to-end key distinct from the common key.

14. The first node of claim 8, wherein the transport header in one or more of the packets includes a value associated with one of the traffic characteristic values, and wherein the value associated with the one of the traffic characteristic value is an authentication header in the transport header of said each packet, wherein the traffic characteristic value is a DiffSery CodePoint (DSCP) value.

* * * * *